US009954855B2

(12) United States Patent
Cao et al.

(10) Patent No.: US 9,954,855 B2
(45) Date of Patent: *Apr. 24, 2018

(54) LOGIN METHOD AND APPARATUS, AND OPEN PLATFORM SYSTEM

(71) Applicant: TENCENT TECHNOLOGY (SHENZHEN) COMPANY LIMITED, Shenzhen (CN)

(72) Inventors: Jinjing Cao, Shenzhen (CN); Minghui Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/676,866

(22) Filed: Aug. 14, 2017

(65) Prior Publication Data

US 2017/0346805 A1    Nov. 30, 2017

Related U.S. Application Data

(63) Continuation of application No. 14/725,041, filed on May 29, 2015, which is a continuation of application No. PCT/CN2013/087780, filed on Nov. 25, 2013.

(30) Foreign Application Priority Data

Nov. 30, 2012 (CN) .......................... 2012 1 0505082

(51) Int. Cl.
- *H04L 29/06* (2006.01)
- *G06F 21/00* (2013.01)
- *H04L 29/08* (2006.01)

(52) U.S. Cl.
CPC ............ *H04L 63/083* (2013.01); *H04L 63/08* (2013.01); *H04L 67/02* (2013.01); *H04L 67/20* (2013.01)

(58) Field of Classification Search
CPC ....... H04L 63/083; H04L 67/20; H04L 67/02; H04L 63/08
See application file for complete search history.

(56) References Cited

U.S. PATENT DOCUMENTS

| 2002/0156922 A1* | 10/2002 | Chan | H04L 29/06 709/246 |
| 2003/0018707 A1* | 1/2003 | Flocken | H04L 29/06 709/203 |

(Continued)

FOREIGN PATENT DOCUMENTS

| CN | 1812403 A | 8/2006 |
| CN | 102624739 A | 8/2012 |
| WO | 2012119620 A | 9/2012 |

OTHER PUBLICATIONS

Liu, Dahong et al., "Research on the Third Party Applications and Open Platforms Interconnection Based on OAuth Authentication", Computer Knowledge and Technology, vol. 8, No. 22, pp. 5367-5369, Aug. 31, 2012 (Aug. 31, 2012).

*Primary Examiner* — Lisa Lewis
(74) *Attorney, Agent, or Firm* — Anova Law Group, PLLC

(57) ABSTRACT

The present disclosure is applicable to the field of network communications, and provides a login method and apparatus, and an open platform system. The method includes: receiving an Access Token parameter provided by a login platform after a user is authenticated and authorized; acquiring an open digital identity (OpenID) of the user by using the received Access Token parameter; and generating a corresponding command word according to a browser environment of a third-party page, and returning the command word to the third-party page, the command word including the Access Token parameter and the OpenID of the user. In the present disclosure, a login platform provides a unified callback address page for a third-party page, and the third-party page can access an open platform without developing a callback-free address page, thereby reducing development costs of the third-party page; a complete login and an openAPI call JS interface are provided and automatic update (Continued)

is supported, and a JS SDK of the latest version can be automatically applied without adjustment of the third-party page, and therefore can work on various intelligent terminals.

19 Claims, 4 Drawing Sheets

(56) References Cited

U.S. PATENT DOCUMENTS

| | | | |
|---|---|---|---|
| 2006/0059422 A1* | 3/2006 | Wu | G06F 17/30899 |
| | | | 715/205 |
| 2006/0122730 A1* | 6/2006 | Niemela | B25J 9/1612 |
| | | | 700/245 |
| 2008/0170477 A1* | 7/2008 | Mitsumori | G11B 27/105 |
| | | | 369/30.04 |
| 2008/0311968 A1* | 12/2008 | Hunter | A63F 13/12 |
| | | | 463/1 |
| 2010/0218100 A1* | 8/2010 | Simon | G06F 17/30056 |
| | | | 715/731 |
| 2012/0117626 A1* | 5/2012 | Yates | H04L 9/3213 |
| | | | 726/4 |
| 2012/0131442 A1* | 5/2012 | Grizim | G06F 17/211 |
| | | | 715/234 |
| 2013/0080544 A1* | 3/2013 | Lyons | G06Q 10/107 |
| | | | 709/206 |
| 2014/0181942 A1* | 6/2014 | Zhou | G06F 21/31 |
| | | | 726/7 |

* cited by examiner

LOGIN METHOD AND APPARATUS, AND OPEN PLATFORM SYSTEM

CROSS-REFERENCES TO RELATED APPLICATIONS

This application is a continuation application of U.S. patent application Ser. No. 14/725,041, filed on May 29, 2015. U.S. patent application Ser. No. 14/725,041 is a continuation of PCT Application No. PCT/CN2013/087780, filed on Nov. 25, 2013, which claims priority to Chinese Patent Application No. CN201210505082.6, filed on Nov. 30, 2012, the entire contents of all of which are incorporated herein by reference.

FIELD OF THE TECHNOLOGY

The present disclosure generally relates to the field of network communications and, more particularly, relates to a login method and apparatus, and an open platform system.

BACKGROUND OF THE DISCLOSURE

A user can log in to a third-party page by using an account of Qzone, Renren, Kaixin, Sina Weibo, Sohu Weibo, Tecent Weibo, Taobao, Douban, MSN, or Google. The login method can gain more effective promotion for the site of the third-party page; can save operational costs of registering an account and costs of subsequently memorizing website accounts and passwords for the user; and can learn rich and valuable content from small and medium-sized websites for an open platform such as Qzone.

At present, most of logins provided by most popular websites may directly provide Andriod and IOS software development kits (SDKs) and the like, and costs of website development are relatively high. However, in an application of an intelligent terminal, many websites do not provide a callback address accessed in a Web manner. Instead, many websites often designate a pseudo protocol in the SDK when the page jumps to a callback address page, end an http request after the page jumps to the callback address page, and directly capture an Access Token parameter from the address.

Logins provided by a part of websites can provide a callback-free address page, for example, Sina Weibo supports a callback-free address page manner, and as shown in FIG. 1, an implementation process is as follows.

1. A login button trigger event of a third-party page is transmitted, by using a message transmission method (post-Message) of a browser, to a platform background service having the same domain name as a login platform.

2. The platform background service opens a new window of a platform login page, and the user completes a login process.

3. The platform login page jumps to a platform cross-domain agent page that is transparent to a third party, and returns related information such as the access Token to the platform cross-domain agent page.

4. The platform cross-domain agent page transmits the related information such as the Access Token to the platform background service.

5. The platform background service transmits the information back to the third-party page by using the browser and notifies that the login is successful.

In the foregoing existing process, the third-party page, the platform background service, and the login platform do not necessarily have the same domain name, that is, the whole process is not necessarily triggered in one event. When the third-party page and the login platform have different domain names, direct communications between the third party and a platform cannot be performed because of the problem of same-origin policy limitations. A part of platforms have implemented some cross-domain communications, but an opened login page may be blocked by the browser at the start step, and implementation mechanism may need to be significantly improved. Moreover, JavaScript SDKs (JS SDKs) provided by some SNS (mainstream social networking services) media websites do not support direct calling of an openAPI, and most of the provided JS SDKs are unavailable in an environment such as an intelligent terminal (or smart terminal), which brings great inconvenience to the development of the third-party page.

SUMMARY

Embodiments of the present invention provide a login method, so as to solve the problem that a callback address of an agent page platform is needed during logging, which brings great inconvenience to the development of a third-party page.

According to one aspect of the present disclosure, a login method is provided. The method includes: receiving an Access Token parameter provided by a login platform after a platform user is authenticated and authorized; acquiring an open digital identity (OpenID) of the platform user by using the received Access Token parameter; and generating a command word according to a browser environment of a third-party page, and returning the command word to the third-party page, the command word including the Access Token parameter and the OpenID of the platform user.

According to another aspect of the present disclosure, a login apparatus is further provided. The apparatus includes: an Access Token parameter receiving unit configured to receive an Access Token parameter provided by a login platform after a platform user is authenticated and authorized; an OpenID acquisition unit configured to acquire an OpenID of the platform user by using the received Access Token parameter; and a command word returning unit configured to generate a command word according to a browser environment of a third-party page, and return the command word to the third-party page, the command word including the Access Token parameter and the OpenID of the platform user.

According to still another aspect of the present disclosure, an open platform system is further provided. The open platform system includes a login apparatus. The login apparatus includes an Access Token parameter receiving unit, configured to receive an Access Token parameter provided by a login platform after a platform user is authenticated and authorized, an OpenID acquisition unit, configured to acquire an OpenID of the platform user by using the received Access Token parameter, and a command word returning unit, configured to generate a command word according to a browser environment of a third-party page, and return the command word to the third-party page, the command word comprising the Access Token parameter and the OpenID of the platform user.

According to yet another aspect of the present disclosure, a non-transitory computer readable storage medium is provided. The non-transitory computer readable storage medium includes a computer readable program stored thereon. When being executed, the computer readable program causes a computer to implement a login method. The method includes: receiving an Access Token parameter provided by a login platform after a platform user is authenticated and authorized; acquiring an open digital identity (OpenID) of the platform user by using the received Access Token parameter; and generating a command word according to a browser environment of a third-party page, and returning the command word to the third-party page, the command word comprising the Access Token parameter and the OpenID of the platform user.

As disclosed, a login platform provides a unified callback address page for a third-party page, and the third-party page can access an open platform without developing a callback-free address page, thereby reducing development costs of the third-party page. A complete login and an openAPI call JS interface are provided and automatic update is supported, and a JS SDK of the latest version can be automatically applied without adjustment of the third-party page, and therefore can be operated on various intelligent terminals.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

The following further describes embodiments of the present invention in detail with reference to the accompanying drawings. It should be understood that the specific embodiments described herein are only used to explain the present disclosure, but are not used to limit the present disclosure.

In the embodiments of the present invention, a login platform provides a unified callback address page for a third-party page, and the third-party page can access an open platform without developing a callback-free address page, thereby reducing development costs of the third-party page.

Figure 1:
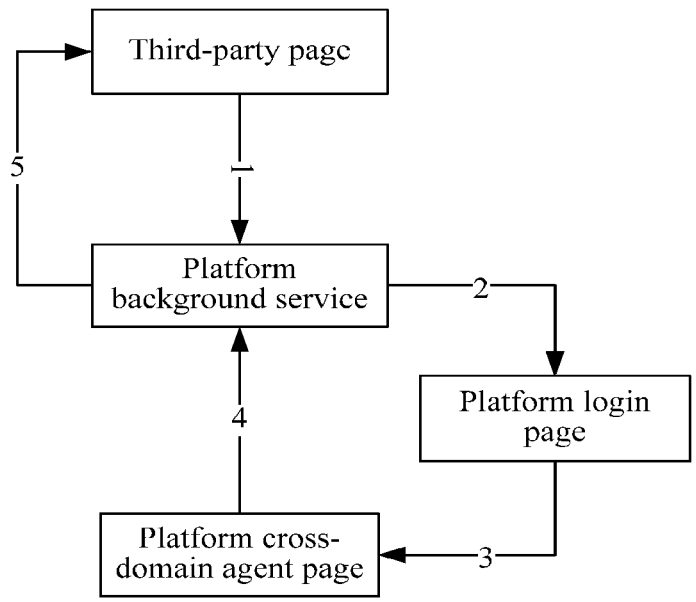
FIG. 1 is an implementation flowchart of a callback-free address page login according to the existing technology.
Figure 2:
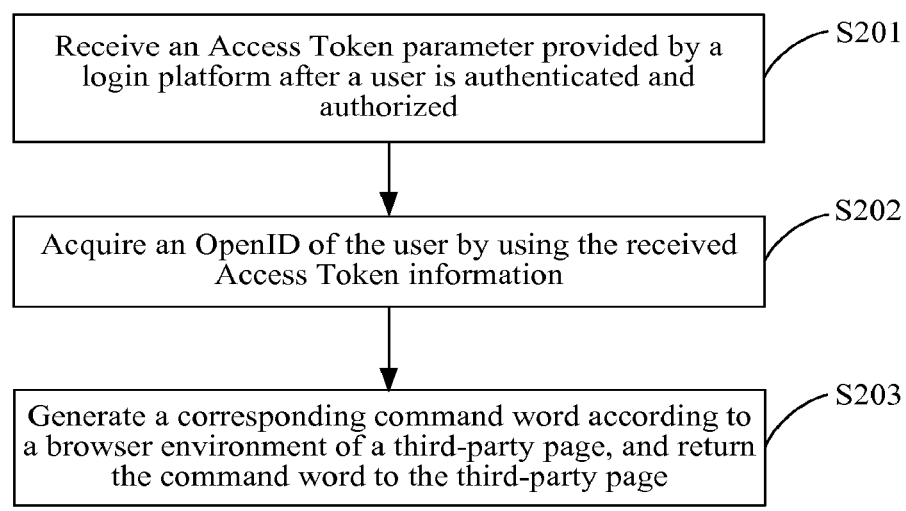
FIG. 2 is an implementation flowchart of a login method according to an embodiment of the present invention.

FIG. 2 shows an implementation flowchart of a login method according to an embodiment of the present invention. The login method starts from step S201.

Step S201: Receive an Access Token parameter provided by a login platform after a user (or a platform user) is authenticated and authorized.

Step S202: Acquire an OpenID of the user by using the received Access Token parameter.

In one embodiment, the OpenID is, for example, a decentralized open free framework used for a user-centered digital identity.

In the OpenID, a user (EndUser) uses an OpenID identifier as a network pass. A relying party (RP) in the OpenID is, for example, an online resource, and can access an object of the RP by using the OpenID identifier. An OpenID provider (OP) is, for example, a site, and the user can declare the OpenID in the site, then log in, and authenticate an identity for any RP.

The RP is generally presented in the form of the identifier provided by the user, and the identifier is standardized as a declarative identifier. A browser of the user is redirected to the OP, and in this way, the user can provide a password thereof and make the identity authenticated. If the authentication succeeds, a user agent may be forwarded to a security resource that the user is trying to access. If the user authentication fails, the RP may reject any access.

The OP is responsible for sending the identifier and executing user identity authentication. The OP collects and keeps some basic information of each user. When the OP is required to authenticate the declarative identifier, the browser of the user is directly switched to a login page. The user inputs a password thereof on the page, and if the user identity authentication succeeds, the OP may switch the browser to a location designated by the RP. If the user identity authentication fails, the user may receive a message indicating that the identity authentication fails from the OP.

As an embodiment of the present invention, a browser environment also needs to be detected when a platform user accesses a third-party page.

In one embodiment, the browser environment of the third-party page can be determined by detecting version information of a browser IE and can also be determined by using other manners. When the browser environment of the third-party page is determined by detecting the version information of the IE, the version information includes a higher version browser environment such as IE8 and IE 9, and a lower version browser environment such as IE6 and IE 7.

Step S203: Generate a command word according to a browser environment of a third-party page, and return the command word to the third-party page.

In one embodiment, the command word may include the Access Token and the OpenID of the user.

In one embodiment, an example format of the command word is as follows:

invoke@@@QC.Login._onLoginBack#OpenID, Access Token.

Under different browser environments, there are different manners of returning a command word. In one embodiment, the command word can be returned to the third-party page by using a return manner supported by the browser of the third-party page.

Figure 3:
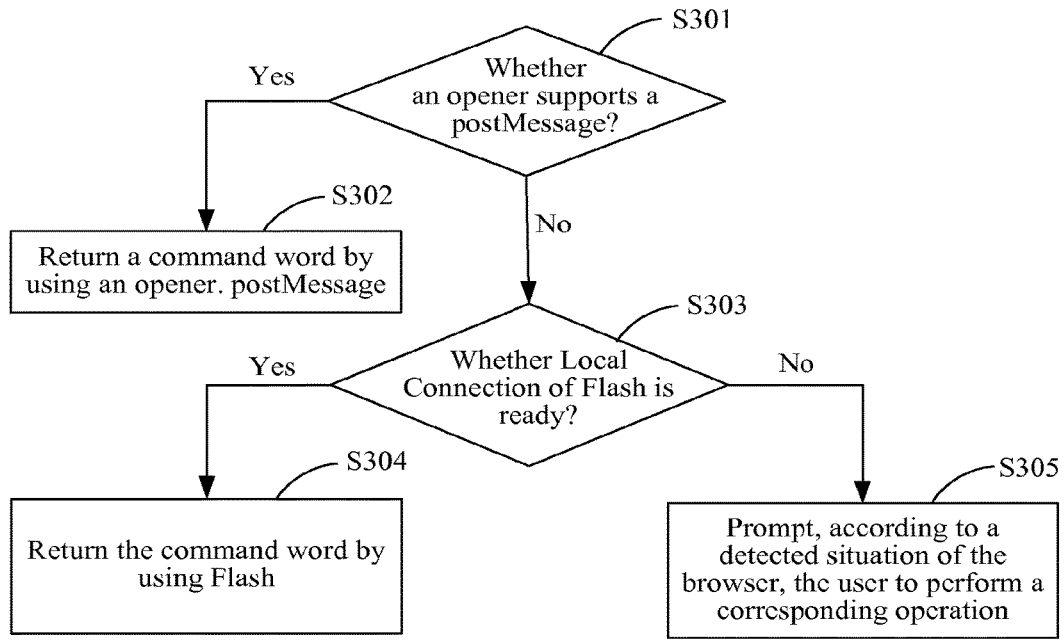
FIG. 3 is an implementation flowchart of returning a command word according to an embodiment of the present invention.

In one embodiment, specific steps of returning the command word to the third-party page by using a return manner supported by the browser of the third-party page, as shown in FIG. 3, are described in detail as follows.

Step S301: Detect whether an opener supports a postMessage of the browser, and perform step S302 if the opener supports the postMessage of the browser; or perform step S303 if the opener does not support the postMessage of the browser.

Step S302: Return the command word by using an opener.postMessage.

Step S303: Detect whether Local Connection of Flash is ready, and perform step S304 if the Local Connection of Flash is ready; or perform step S304 if the Local Connection of Flash is not ready.

Step S304: Return the command word by using Flash.

Step S305: Prompt, according to a detected situation of the browser, the user to perform a corresponding operation.

For example, the user is prompted to install a Flash plug-in when it is detected that the user does not install the Flash plug-in.

In one embodiment, higher version IE browser environments have a protection mode, and in the protection mode, the browsers are restricted by default to be inaccessible to each other. In this case, Flash needs to be used to return the command word.

In one embodiment, an opener refers to "who opens me", for example, a page A pops up a window of a page B by using window.open, a window in which the page A is located is an opener of the page B, and the page B can access the page A by using an object of the opener.

As an embodiment of the present invention, whether Local Connection of Flash is ready can also be detected; and if the Local Connection of Flash is ready, the command word is returned to the third-party page by using Flash.

Figure 4:
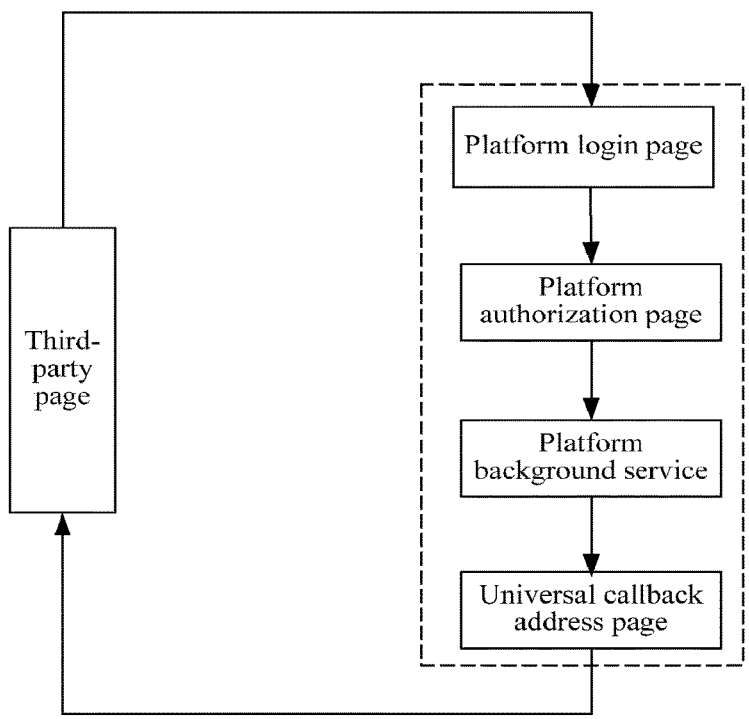
FIG. 4 is an implementation flowchart of a callback-free address page login according to an embodiment of the present invention.

FIG. 4 shows an implementation process of a callback-free address page login according to an embodiment of the present invention, and the details are as follows.

1. A login button trigger event of a third-party page is transmitted to a platform login page by using a postMessage of a browser.

2. The platform login page jumps to a platform authorization page, and the platform authorization page authenticates user information.

3. After the platform authorization page authenticates the user information, a platform background service carrying an Access Token parameter jumps page to a universal callback address page.

4. The universal callback address page receives the Access Token parameter provided by the platform background service, acquires an OpenID of a user by using the received Access Token parameter, detects a browser environment of the third-party page when the platform user accesses the third-party page, generates a corresponding command word according to the browser environment of the third-party page, and returns the command word to the third-party page by using a return manner supported by the browser of the third-party page.

5. After receiving the returned command word, an opener of the third-party page parses the command word and triggers an event that the opener page receives the returned information, and a default behavior of the triggered event is to update the "login" button to a state of "logged-in".

The dotted part in FIG. 4 is configured in the login platform. When the third-party page is logged in to, the login platform provides a unified callback address page without relying on the platform background service and a platform cross-domain agent page any more.

Figure 5:
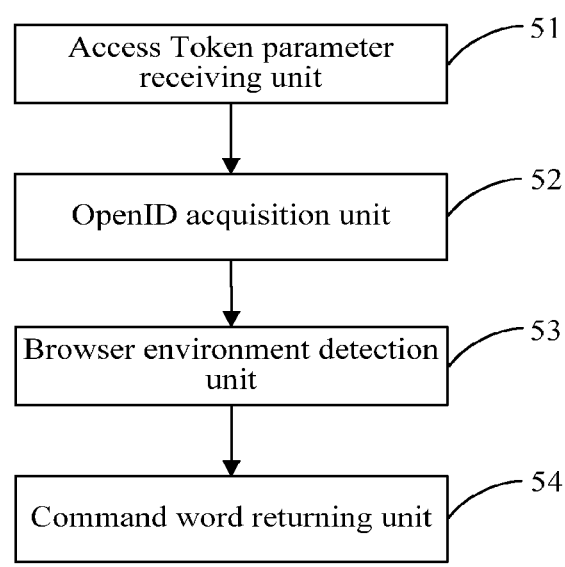
FIG. 5 is a structural diagram of a login apparatus according to an embodiment of the present invention.

FIG. 5 shows a structure of a login apparatus according to an embodiment of the present invention. For ease of description, only the part related to this embodiment of the present invention is shown.

The login apparatus may be widely used in various open platform systems, and a third-party page can access an open platform without developing a callback-free address page.

As an embodiment of the present invention, the login apparatus includes an Access Token parameter receiving unit 51, an OpenID acquisition unit 52, a browser environment detection unit 53, and a command word returning unit 54.

The Access Token parameter receiving unit 51 receives an Access Token parameter provided by a login platform after a user is authenticated and authorized.

The OpenID acquisition unit 52 acquires an OpenID of the user by using the Access Token parameter received by the Access Token parameter receiving unit 51.

The browser environment detection unit 53 detects a browser environment of the third-party page when the platform user accesses the third-party page.

The command word returning unit 54 generates a command word according to the browser environment of the third-party page detected by the browser environment detection unit 53, and returns the command word to the third-party page.

In one embodiment, the command word includes the Access Token and the OpenID of the user. As an embodiment of the present invention, under different browser environments, there are different manners of returning a command word. In one embodiment, the command word is returned to the third-party page by using a return manner supported by the browser of the third-party page.

As an embodiment of the present invention, the command word is returned to the third-party page by using a return manner supported by the browser of the third-party page. If an opener supports a postMessage of the browser, the command word returning unit 54 returns the command word to the third-party page by using an opener. postMessage; and if the opener does not support the postMessage of the browser, the command word returning unit 54 returns the command word to the third-party page by using Flash.

As an embodiment of the present invention, the command word is returned to the third-party page by using a return manner supported by the browser of the third-party page. The command word returning unit 54 returns the command word to the third-party page by using Flash.

According to an embodiment of the present invention, the login method shown in FIG. 2 may be a login method executed by units of the login apparatus shown in FIG. 5. For example, step S201 shown in FIG. 2 may be executed by the Access Token parameter receiving unit 51 shown in FIG. 5; step S202 shown in FIG. 2 may be executed by the OpenID acquisition unit 52 shown in FIG. 5; and step S203 shown in FIG. 2 may be executed by the command word returning unit 54 shown in FIG. 5.

According to another embodiment of the present invention, units of the login apparatus shown in FIG. 5 can be separately or combined as one or more other forming units, or one (or more) unit(s) herein can further be divided into multiple forming units with desired functions. In this way, same operations can be implemented, and implementation of the technical effects of embodiments of the present invention is not affected.

According to still another embodiment of the present invention, the login apparatus shown in FIG. 5 can be constructed by running a computer program (including program code) that can execute the login method shown in FIG. 2 on a computing device, for example, as a computer, that includes processing elements and storage elements such as a central processing unit (CPU), a random access memory (RAM), and a read-only memory (ROM) so as to implement the login method according to the embodiments of the present invention. The computer program can be recorded on, for example, a computer readable record medium, and can be mounted in the computing device by using the computer readable record medium and runs in the computing device.

For example, the disclosed methods can be implemented by an apparatus/device including one or more processor, and a non-transitory computer-readable storage medium having instructions stored thereon. The instructions can be executed by the one or more processors of the apparatus/device to implement the methods disclosed herein. In some cases, the instructions can include one or more units corresponding to the disclosed methods.

Figure 6:
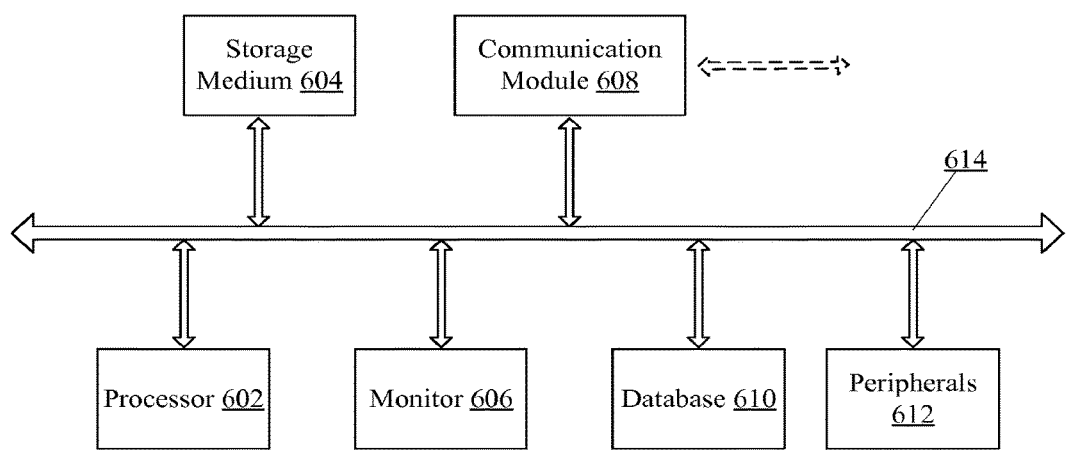
FIG. 6 illustrates an exemplary computing device consistent with the disclosed embodiments.

For example, FIG. 6 illustrates an exemplary computing device capable of implementing the disclosed methods, consistent with the disclosed embodiments. As shown in FIG. 6, the exemplary computing device 600 may include a processor 602, a storage medium 604, a monitor 606, a communication module 608, a database 610, peripherals 612, and one or more bus 614 to couple the devices together. Certain devices may be omitted and other devices may be included.

Processor 602 may include any appropriate processor or processors. Further, processor 602 may include multiple cores for multi-thread or parallel processing. The processor 602 may be used to run computer program(s) stored in the storage medium 604. Storage medium 604 may include memory modules, such as ROM, RAM, and flash memory modules, and mass storages, such as CD-ROM, U-disk, removable hard disk, etc. Storage medium 604 may store computer programs for implementing various disclosed processes, when executed by processor 602. In one embodiment, storage medium 604 may be a non-transient computer-readable storage medium having a computer program stored thereon, when being executed, to cause the computer to implement the disclosed methods.

Further, peripherals 612 may include I/O devices such as keyboard and mouse, and communication module 608 may include network devices for establishing connections, e.g., through a communication network such as the Internet. Database 610 may include one or more databases for storing certain data and for performing certain operations on the stored data, such as webpage browsing, database searching, etc.

In one embodiment, a login platform provides a unified callback address page for a third-party page, and the third-party page can access an open platform without developing a callback-free address page, thereby reducing development costs of the third-party page; a complete login and an openAPI call JS interface are provided and automatic update is supported, and a JS SDK of the latest version can be automatically applied without adjustment of the third-party page, and therefore can work on various intelligent terminals.

The foregoing describes embodiments of the present invention, but they are not intended to limit the scope of the present disclosure. The scope of the present disclosure is defined by the appended claims. Any modification, equivalent replacement, or improvement made within the spirit and principle of the present disclosure shall fall within the protection scope of the present disclosure.

What is claimed is:

1. A login method, comprising:
   receiving, by a universal callback address page, an Access Token parameter provided by a login platform in response to a login event triggered at a third-party page;
   acquiring, at the universal callback address page, an open digital identity (OpenID) of the platform user by using the received Access Token parameter;
   generating, at the universal callback address page, a command word according to a browser environment of the third-party page, the command word comprising the Access Token parameter and the OpenID of the platform user; and
   returning the command word to the third-party page.

2. The method according to claim 1, further comprising:
   before generating the command word according to the browser environment of the third-party page, detecting the browser environment of the third-party page when the platform user accesses the third-party page.

3. The method according to claim 2, wherein returning the command word to the third-party page comprises:
   returning the command word to the third-party page by using an opener.postMessage, in response to detecting that an opener supports a message transmission method (postMessage) of the browser; and
   returning the command word to the third-party page by using Flash in response to detecting that the opener does not support the postMessage of the browser.

4. The method according to claim 1, wherein returning the command word to the third-party page comprises:
   returning the command word to the third-party page by using a cross-domain return manner supported by the browser, wherein the browser is redirected from the universal callback address page at a first domain to the third-party page at a second domain with the command word.

5. The method according to claim 1, wherein returning the command word to the third-party page further comprises:
   detecting whether Local Connection of Flash is ready; and
   returning the command word to the third-party page by using Flash, in response to detecting that the Local Connection of Flash is ready.

6. The method according to claim 1, wherein the universal callback address page is provided by the login platform after a platform user is authenticated and authorized at a platform authorization page.

7. A login apparatus, comprising:
   a memory; and
   a processor coupled to the memory, the processor being configured to:
   receive, by a universal callback address page, an Access Token parameter provided by a login platform in response to a login event triggered at a third-party page;
   acquire, at the universal callback address page, an open digital identity (OpenID) of the platform user by using the received Access Token parameter;
   generate, at the universal callback address page, a command word according to a browser environment of the third-party page, the command word comprising the Access Token parameter and the OpenID of the platform user; and
   return the command word to the third-party page.

8. The apparatus according to claim 7, wherein the processor is further configured to:
   before generating the command word according to the browser environment of the third-party page, detect the browser environment of the third-party page when the platform user accesses the third-party page.

9. The apparatus according to claim 8, wherein the processor is further configured to:
   return the command word to the third-party page by using an opener.postMessage, in response to detecting that an opener supports a postMessage of the browser; and
   return the command word to the third-party page by using Flash, in response to detecting that the opener does not support the postMessage of the browser.

10. The apparatus according to claim 7, wherein the processor is further configured to:
    return the command word to the third-party page by using a cross-domain return manner supported by the browser of the third-party page, wherein the browser is redirected from the universal callback address page in a first domain to the third-party page in a second domain with the command word.

11. The apparatus according to claim 7, wherein the processor is further configured to:
detecting whether Local Connection of Flash is ready; and
return the command word to the third-party page by using Flash, in response to detecting that the Local Connection of Flash is read.

12. The apparatus according to claim 7, wherein the universal callback address page is provided by the login platform after a platform user is authenticated and authorized at a platform authorization page.

13. A non-transitory computer readable storage medium comprising a computer readable program stored thereon, wherein, when being executed, the computer readable program causes a computer to implement a login method, the method comprising:
receiving, by a universal callback address page, an Access Token parameter provided by a login platform in response to a login event triggered at a third-party page;
acquiring, at the universal callback address page, an open digital identity (OpenID) of the platform user by using the received Access Token parameter;
generating, at the universal callback address page, a command word according to a browser environment of the third-party page, the command word comprising the Access Token parameter and the OpenID of the platform user; and
returning the command word to the third-party page.

14. The medium according to claim 13, wherein the method further comprises:
before generating the command word according to the browser environment of the third-party page, detecting the browser environment of the third-party page when the platform user accesses the third-party page.

15. The medium according to claim 14, wherein returning the command word to the third-party page comprises:
returning the command word to the third-party page by using an opener.postMessage, in response to detecting that an opener supports a message transmission method (postMessage) of the browser; and
returning the command word to the third-party page by using Flash in response to detecting that the opener does not support the postMessage of the browser.

16. The medium according to claim 13, wherein returning the command word to the third-party page comprises:
returning the command word to the third-party page by using a cross-domain return manner supported by the browser, wherein the browser is redirected from the universal callback address page at a first domain to the third-party page at a second domain with the command word.

17. The medium according to claim 13, wherein returning the command word to the third-party page further comprises:
detecting whether Local Connection of Flash is ready; and
returning the command word to the third-party page by using Flash, in response to detecting that the Local Connection of Flash is ready.

18. The medium according to claim 13, wherein returning the command word to the third-party page further comprises:
detecting whether the browser environment includes an IE browser environment in a protection mode; and
returning the command word to the third-party page by using Flash, in response to detecting that the browser environment includes the IE browser environment in the protection mode.

19. The medium according to claim 13, wherein the universal callback address page is provided by the login platform after a platform user is authenticated and authorized at a platform authorization page.

* * * * *